(12) United States Patent
Fujisawa

(10) Patent No.: US 9,380,046 B2
(45) Date of Patent: Jun. 28, 2016

(54) COMMUNICATION APPARATUS AND CONTROL METHOD THEREFOR

(71) Applicant: CANON KABUSHIKI KAISHA, Tokyo (JP)

(72) Inventor: Kunimasa Fujisawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 774 days.

(21) Appl. No.: 13/665,805

(22) Filed: Oct. 31, 2012

(65) Prior Publication Data

US 2013/0124857 A1    May 16, 2013

(30) Foreign Application Priority Data

Nov. 14, 2011    (JP) .................... 2011-249070

(51) Int. Cl.
H04L 29/06    (2006.01)
(52) U.S. Cl.
CPC ........ *H04L 63/0823* (2013.01); *H04L 63/1441* (2013.01)
(58) Field of Classification Search
CPC combination set(s) only.
See application file for complete search history.

(56) References Cited

U.S. PATENT DOCUMENTS

| 6,947,949 | B2 | 9/2005 | Fujisawa |
| 8,015,560 | B2 | 9/2011 | Fujisawa |
| 8,161,148 | B2 | 4/2012 | Tamura |
| 2005/0021954 | A1 | 1/2005 | Kung |
| 2006/0075219 | A1* | 4/2006 | Callaghan et al. ............ 713/156 |
| 2006/0168443 | A1* | 7/2006 | Miller et al. .................. 713/156 |
| 2009/0187760 | A1* | 7/2009 | Elizarov et al. ............... 713/156 |

FOREIGN PATENT DOCUMENTS

| CN | 1309487 | 8/2001 |
| JP | 2005-130449 | 5/2005 |
| JP | 2006-14182 | 1/2006 |
| JP | 2006-20017 | 1/2006 |

OTHER PUBLICATIONS

Seji Takegata, "JSP Business Application Introduction to Short-Term Development", Rutles, Inc., Aug. 25, 2007, pp. 238-246, 252-254.
Japanese Office Action issued Jun. 5, 2015 during prosecution of related Japanese application No. 2011-249070.
Chinese Office Action (with whole English translation) issued in counterpart Chinese Application No. 201210466829.1 on Apr. 28, 2015.

* cited by examiner

*Primary Examiner* — Azizul Choudhury
(74) *Attorney, Agent, or Firm* — Fitzpatrick, Cella, Harper & Scinto

(57) ABSTRACT

It is determined whether a user who has logged in in communication using a selfsigned certificate stored by default is an administrator or a general user. If it is determined that the user is an administrator, an install page for a CA-signed certificate which is more reliable than the selfsigned certificate is returned to the user. Alternatively, if it is determined that the user is a general user, an error page is returned to the user.

15 Claims, 7 Drawing Sheets

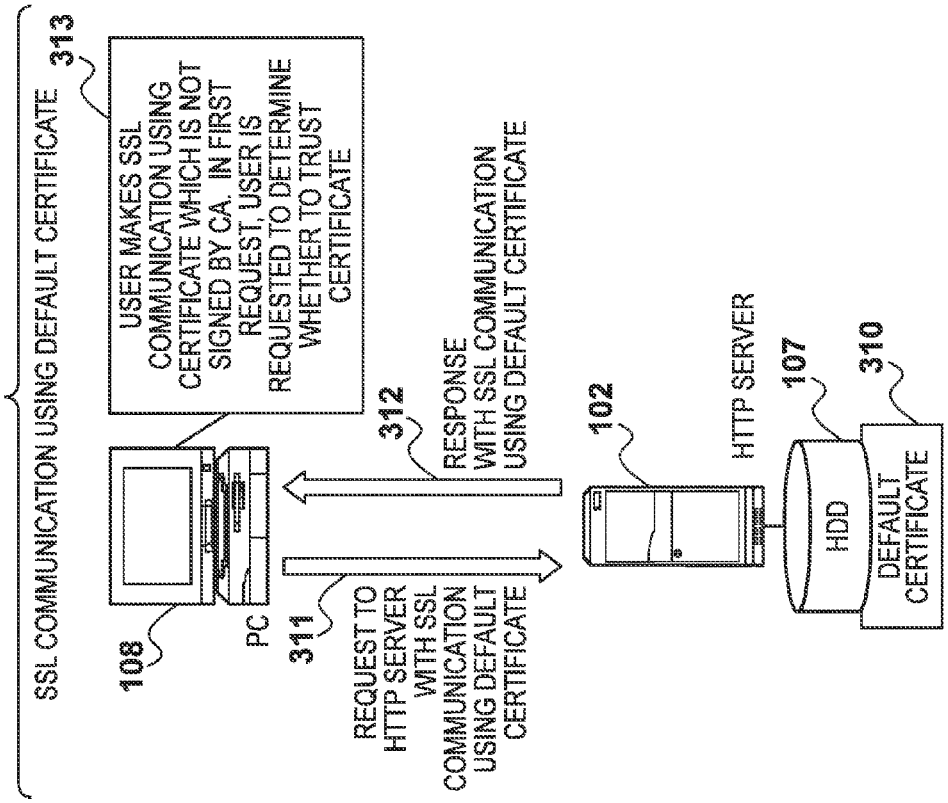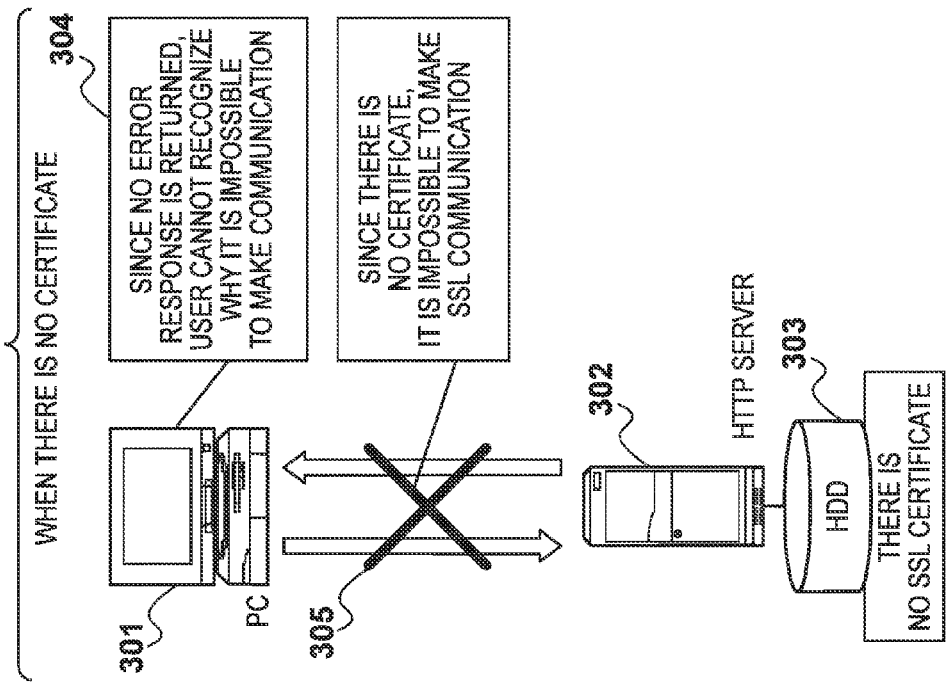

COMMUNICATION APPARATUS AND CONTROL METHOD THEREFOR

BACKGROUND OF THE INVENTION

1. Field of the Invention

The present invention relates to a communication apparatus with an HTTP server function, and a control method for the communication apparatus.

2. Description of the Related Art

An HTTP server or HTTPS server (secure HTTP based on SSL) operating on an image processing apparatus or the like displays a Web page in response to an HTTP or HTTPS request. HTTPS communication requires an SSL (Secure Socket Layer) certificate to prevent server spoofing and to realize communication path encryption. If there is no such certificate, the server cannot receive an HTTPS request from a client.

The SSL certificate includes a certificate (to be referred to as a CA-signed certificate hereinafter) which is signed by a CA (Certificate Authority), and a selfsigned certificate which is not signed by a CA. If the selfsigned certificate is used, it is impossible to prevent server spoofing. A user who connects to an HTTPS server which uses a selfsigned certificate has to determine whether to trust the selfsigned certificate presented by the server.

On the other hand, the CA-signed certificate is expensive. Furthermore, since the certificate includes the host name of the apparatus of the user on the network, it is impossible to install it upon shipping an embedded apparatus such as an image processing apparatus. Therefore, an embedded apparatus on which a selfsigned certificate created by a manufacturer has been installed is shipped.

To make SSL communication between the browser of a PC and an image processing apparatus or the like on the server side on which a Web application operates, an SSL certificate is necessary on the server side to realize communication path encryption and to prevent apparatus spoofing. The SSL certificate includes a CA-signed certificate and a selfsigned certificate which is not signed by a CA. Since a CA-signed certificate includes information (a host name and the like) of an apparatus, it is necessary to acquire a CA-signed certificate for each server from the CA. Furthermore, a CA-signed certificate is expensive. When shipping an image processing apparatus on the server side, therefore, not a CA-signed certificate but a selfsigned certificate has been installed on it. This is because the apparatus cannot receive any SSL communication from a client without an SSL certificate, and thus cannot even notify the user on the client side that there is no SSL certificate.

Since any user can create a selfsigned certificate, it is useless for preventing apparatus spoofing by an attacker. Although the certificate can be used for communication path encryption, the communication path may be wiretapped by spoofing. To execute secure SSL communication, it is necessary to install a CA-signed certificate on an image processing apparatus on the server side, and use it.

Japanese Patent Laid-Open No. 2005-130449 describes a technique in which when there is only a selfsigned certificate, a certificate install page is returned to a client. Although the certificate install page should be used by only the administrator of an apparatus, however, it is impossible to limit access to the certificate install page by a general user.

SUMMARY OF THE INVENTION

An aspect of the present invention is to eliminate the above-mentioned problems with the conventional technology.

The present invention provides a technique in which when there is only a default selfsigned certificate, a certificate install page is returned to only the administrator, and an error message is returned to a general user.

The present invention in its first aspect provides a communication apparatus comprising: a certificate storage unit configured to store a certificate; a first determination unit configured to determine whether the certificate stored in the certificate storage unit is a selfsigned certificate; a second determination unit configured to determine whether a user who has logged in in communication using the certificate stored in the certificate storage unit is an administrator or a general user; and a response unit configured to return, if the first determination unit determines that the certificate stored in the certificate storage unit is a selfsigned certificate and the second determination unit determines that the user is an administrator, an install page for a CA-signed certificate which is more reliable than the selfsigned certificate.

The present invention in its second aspect provides a control method of controlling a communication apparatus with an HTTP server function, comprising: a certificate storage step of storing a certificate; a first determination step of determining whether the certificate stored in the certificate storage step is a selfsigned certificate; a second determination step of determining whether a user who has logged in in communication using the certificate stored in the certificate storage step is an administrator or a general user; and a response step of returning, if it is determined in the first determination step that the certificate stored in the certificate storage step is a selfsigned certificate and it is determined in the second determination step that the user is an administrator, an install page for a CA-signed certificate which is more reliable than the selfsigned certificate.

According to the present invention, it is possible to provide a CA-signed certificate install page to only an administrator.

Further features of the present invention will become apparent from the following description of exemplary embodiments with reference to the attached drawings.

BRIEF DESCRIPTION OF THE DRAWINGS

FIG. 3A is a view showing an overview of processing which is executed when a conventional HTTP server has no SSL certificate;

FIG. 3B is a view showing an overview of processing which is executed upon receiving a request when a selfsigned certificate is held as a default certificate;

DESCRIPTION OF THE EMBODIMENTS

Figure 1:
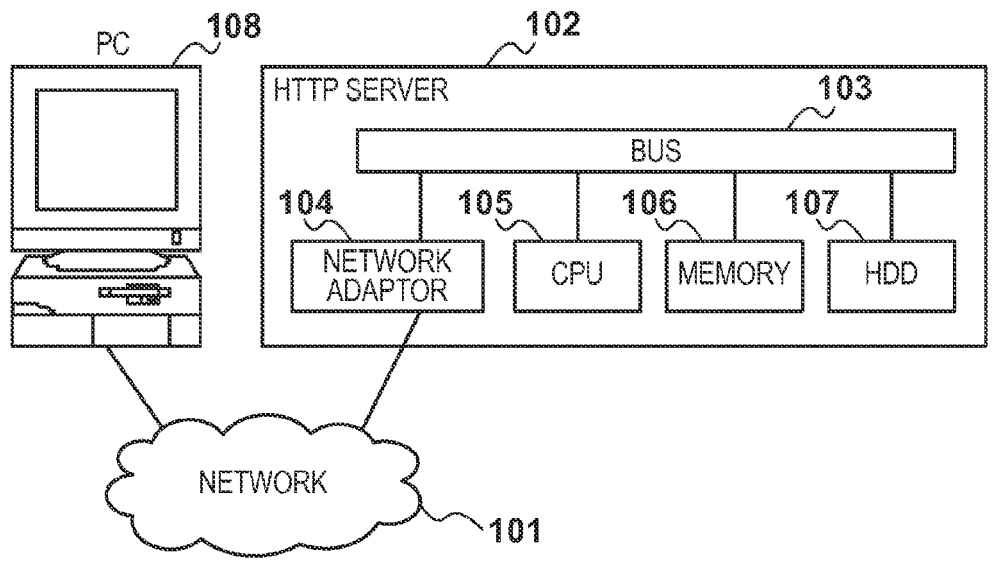
FIG. 1 is a block diagram showing the configuration of a network system including an HTTP server according to an embodiment.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same components have the same reference numerals, and a description thereof will be omitted.

FIG. 1 is a block diagram showing the configuration of a network system including an HTTP server 102 (a communication apparatus with an HTTP server function) according to an embodiment.

The HTTP server 102 is connected with a PC 108 as a client via a network 101, and HTTP communication is made between them. The HTTP server 102 includes a network adaptor 104, a CPU 105, a memory 106, and an HDD (Hard Disk Drive) 107, which are connected with each other by a bus 103. The network adaptor 104 controls communication with another apparatus via the network 101. The CPU 105 controls the operation of the HTTP server 102 as a whole by executing a program stored in the memory 106 while executing HTTP processing and SSL encryption. The memory 106 stores a program to be executed by the CPU 105, and provides a work memory necessary for the CPU 105 to process data. The HDD 107 holds Web contents such as HTML data and an HTTP server program to be executed by the CPU 105.

Figure 2:
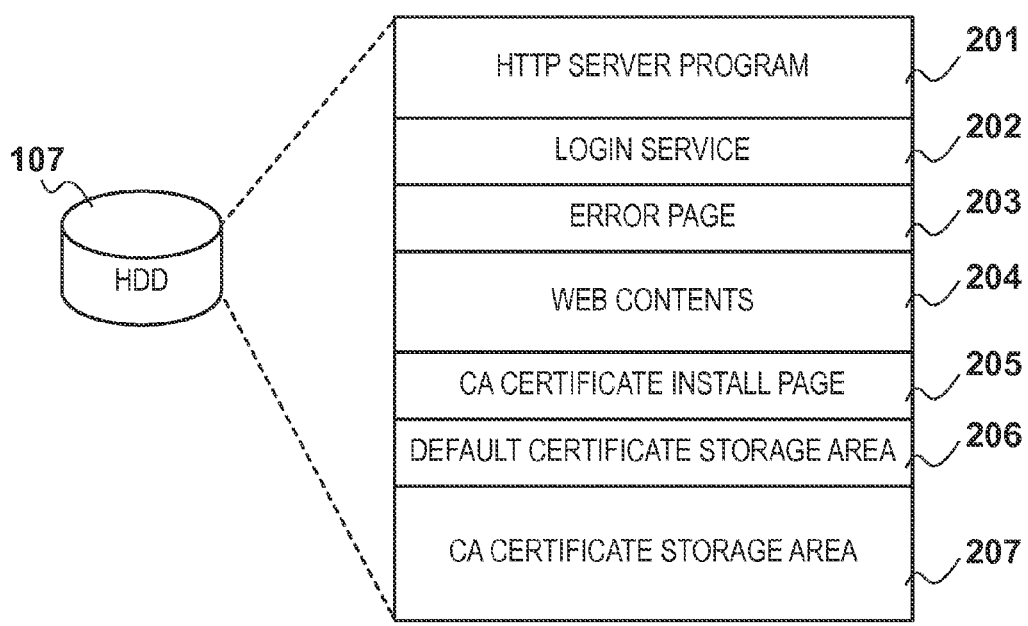
FIG. 2 is a view for explaining information stored in the HDD of the HTTP server according to the embodiment.

FIG. 2 is a view for explaining information stored in the HDD 107 of the HTTP server 102 according to the embodiment.

The HDD 107 stores an HTTP server program 201, a login service program 202, an error page program 203, Web contents 204, and a CA certificate install page program 205. Furthermore, the HDD 107 includes a default certificate storage area 206 for storing information of a default certificate, and a CA certificate storage area 207 for storing information of a CA certificate.

FIGS. 3A and 3B are views showing an overview of processing which is executed when the HTTP server has no SSL certificate, and processing which is executed upon receiving a request when a selfsigned certificate is held as a default certificate.

When there is no certificate as shown in FIG. 3A, an HDD 303 stores no certificate even if a PC 301 sends a request to an HTTP server 302. As denoted by reference numeral 305, therefore, it is impossible to make SSL communication. Thus, a browser operating on the PC 301 presents a communication error to the user. In this case, since no error response is returned to the PC 301, the user of the PC 301 cannot recognize the reason why it is impossible to make communication, for example, the reason that there is no certificate or that an error has occurred in communication, as denoted by reference numeral 304.

FIG. 3B shows a case in which the HTTP server 102 according to the embodiment has a selfsigned certificate as a default certificate. The PC 108 transmits, to the HTTP server 102, a request with SSL communication using a default certificate 310 stored in the HDD 107 in 311. An example of the screen of the browser at this time is a screen 401 shown in FIG. 4.

Figure 4:
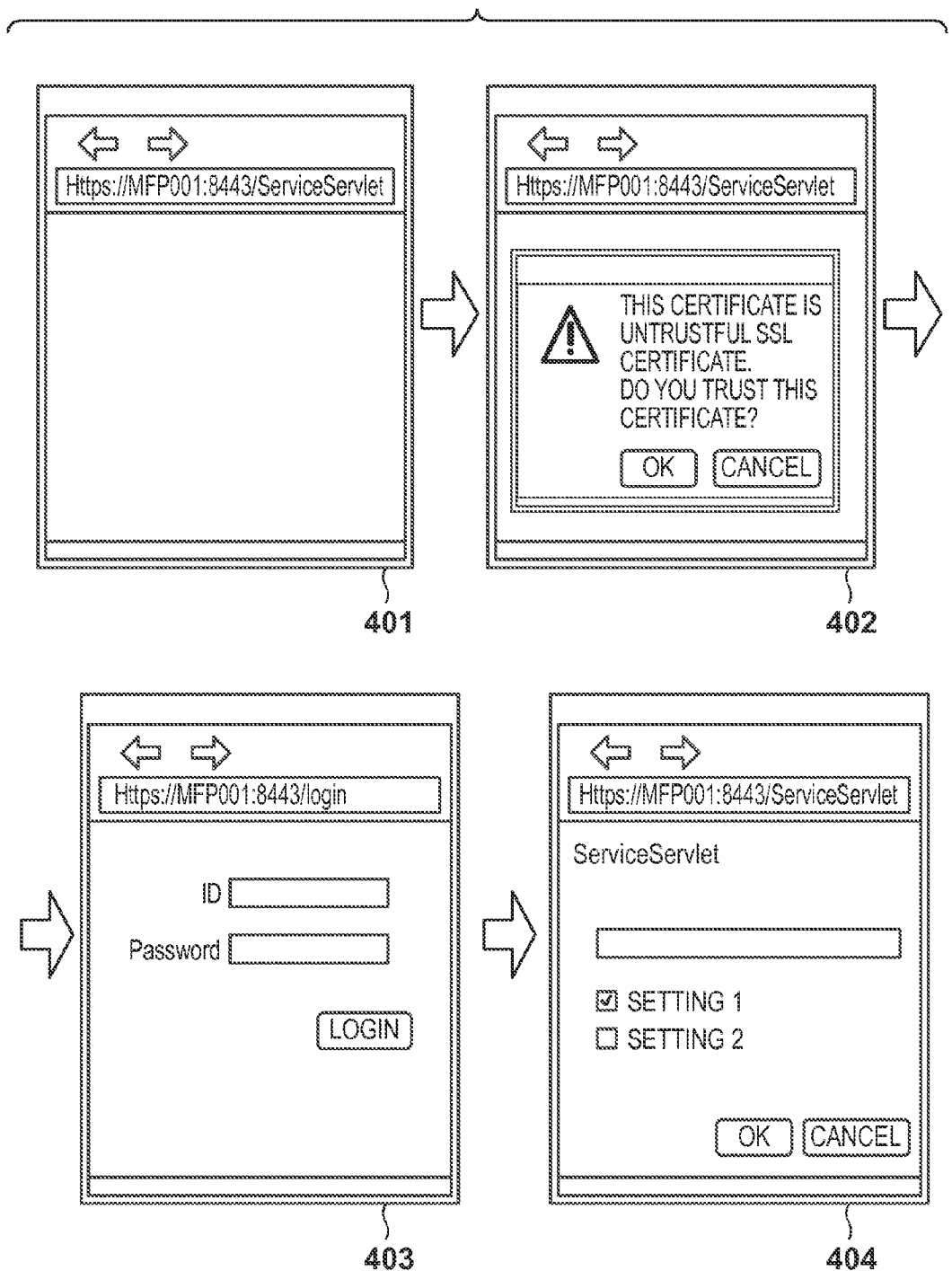
FIG. 4 is a view for explaining examples of the screen of a browser corresponding to FIG. 3A.

FIG. 4 is a view for explaining examples of the screen of the browser corresponding to FIG. 3A.

The HTTP server 102 transmits a response to the request with SSL communication using the default certificate 310 in 312. Then, the browser displays a dialog 402 shown in FIG. 4, and requests the user to determine whether to trust the default certificate which is not signed by the CA to continue the communication in 313.

If the user determines to trust the default certificate, and requested Web contents require a login operation, the browser displays a screen 403 shown in FIG. 4 for logging into the HTTP server 102. If the login operation using the screen succeeds, the browser displays the Web contents on a screen 404 shown in FIG. 4. Note that if the contents do not require a login operation, the browser directly displays the Web contents on the screen 404 by skipping the screen 403 of FIG. 4.

Figure 5:
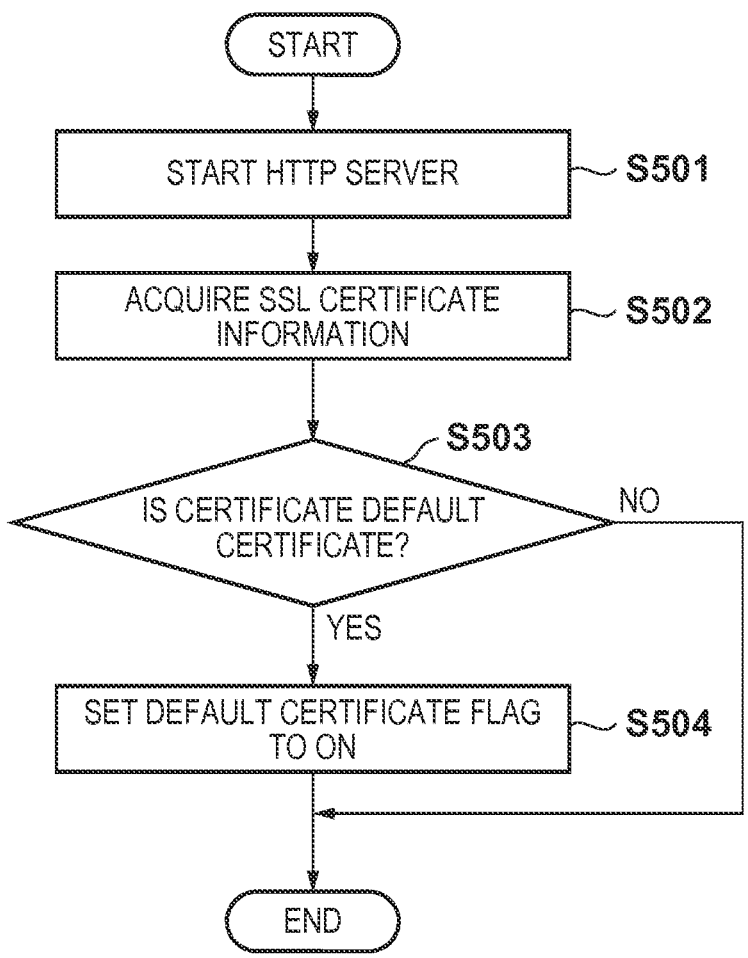
FIG. 5 is a flowchart for explaining processing which is executed upon start of the HTTP server according to the embodiment.

FIG. 5 is a flowchart for explaining processing which is executed upon start of the HTTP server 102 according to the embodiment. This processing is implemented when the CPU 105 executes a program stored in the memory 106.

When the HTTP server 102 starts in step S501, the process advances to step S502 to acquire information of a selected SSL certificate from the default certificate storage area 206 and CA certificate storage area 207 of the HDD 107. Next, the process advances to step S503 to determine based on the acquired information of the SSL certificate whether the certificate is a default certificate which is a selfsigned certificate (that is, which is not a CA-signed certificate). If it is determined that the certificate is a default certificate, the process advances to step S504 to set a default certificate flag (provided in the memory 106) to ON, and the start processing ends. On the other hand, if it is determined in step S503 that the certificate is not a default certificate (that is, the certificate is a CA-signed certificate), the process skips step S504 (sets the default certificate flag to OFF), and the start processing ends.

Figure 6:
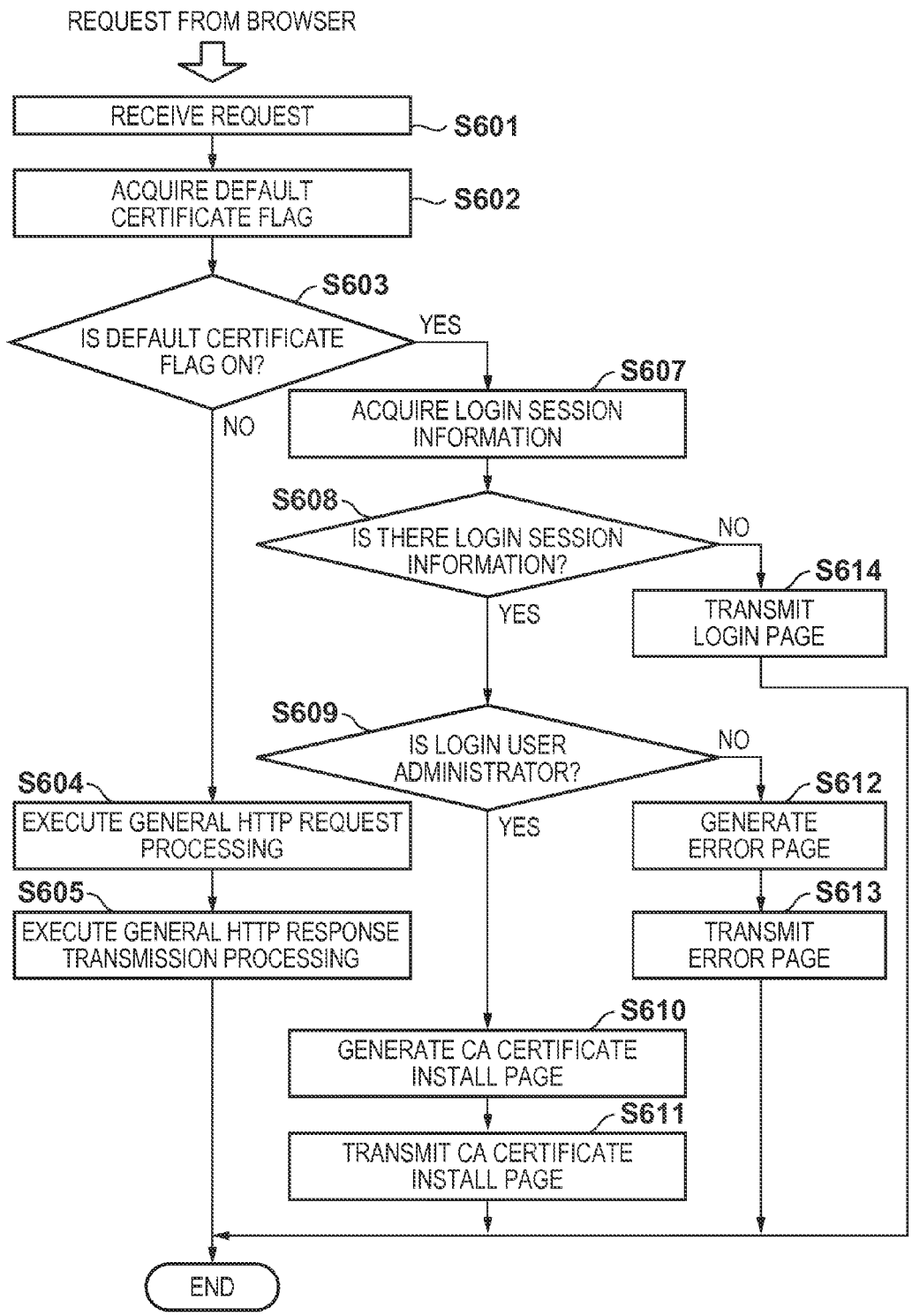
FIG. 6 is a flowchart for explaining processing which is executed by an HTTP server 102 according to the embodiment upon receiving a request from the browser.

FIG. 6 is a flowchart for explaining processing which is executed by the HTTP server 102 according to the embodiment upon receiving a request from the browser. This processing is implemented when the CPU 105 executes a program stored in the memory 106.

Figure 8:
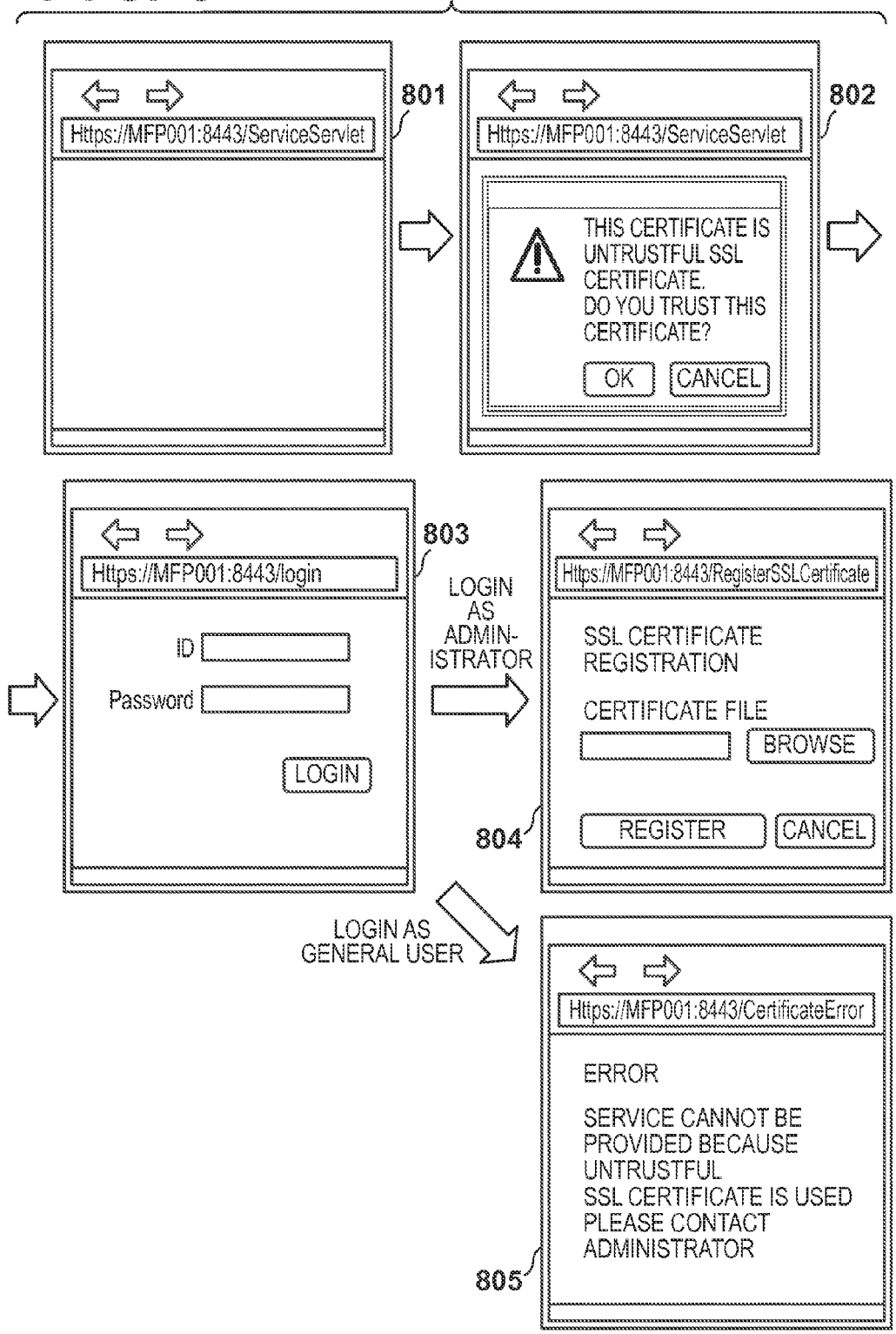
FIG. 8 is a view showing examples of a screen which is displayed on the browser according to the processing of FIG. 6 according to the embodiment.

FIG. 8 is a view showing examples of a screen which is displayed on the browser according to the processing of FIG. 6 according to the embodiment.

This processing starts when the browser of the PC 108 issues a request to the HTTP server 102. In step S601, the HTTP server 102 receives the request. Then, the browser displays a dialog 802 shown in FIG. 8, and requests the user to determine whether to trust the default certificate which is not signed by the CA to continue the communication. Note that reference numeral 801 in FIG. 8 denotes an initial screen of the browser when the processing in FIG. 6 starts. The process advances to step S602, in which the HTTP server 102 acquires the default certificate flag from the memory 106. In step S603, the HTTP server 102 determines whether the default certificate flag is ON. If the default certificate flag is OFF, a CA-signed certificate is used. Thus, the process advances to step S604 to execute general HTTP response processing. That is, the HTTP server 102 executes processing for a general HTTP request in step S604, and transmits requested Web contents as a response in step S605, thereby terminating the response processing.

On the other hand, if the default certificate flag is ON in step S603, the process advances to step S607 to acquire login session information. The process then advances to step S608 to determine whether a valid login session has been acquired. If a valid login session has not been acquired, the process advances to step S614 to transmit a login page 803 shown in FIG. 8, and the HTTP request/response processing ends.

That is, upon receiving a response, the browser displays the login page 803 shown in FIG. 8, and stands by for a user login operation. If the user performs a login operation by inputting a user ID and password, the browser transmits a request to the HTTP server 102 again. With this operation, the processing from step S601 is executed.

On the other hand, if it is determined in step S608 that a login session is valid, the process advances to step S609 to determine based on the login session information whether the login user is an administrator or a general user. If it is determined that the login user is a general user, the process advances to step S612 to generate an error page. Then, the process advances to step S613 to transmit, as a response, the error page generated in step S612 to the PC 108, and the HTTP request/response processing ends.

Upon receiving the error response, the browser displays, for example, an error page 805 shown in FIG. 8.

The error page 805 of FIG. 8 displays information indicating that it is impossible to provide a service because an untrustful default certificate is used.

On the other hand, if the login user is an administrator in step S609, the process advances to step S610 to generate a CA certificate install page. After that, the process advances to step S611 to transmit, as a response, the CA certificate install page generated in step S610 to the PC 108, and the HTTP request/response processing ends.

Upon receiving the response, the browser displays a CA certificate install page 804 shown in FIG. 8.

Figure 7:
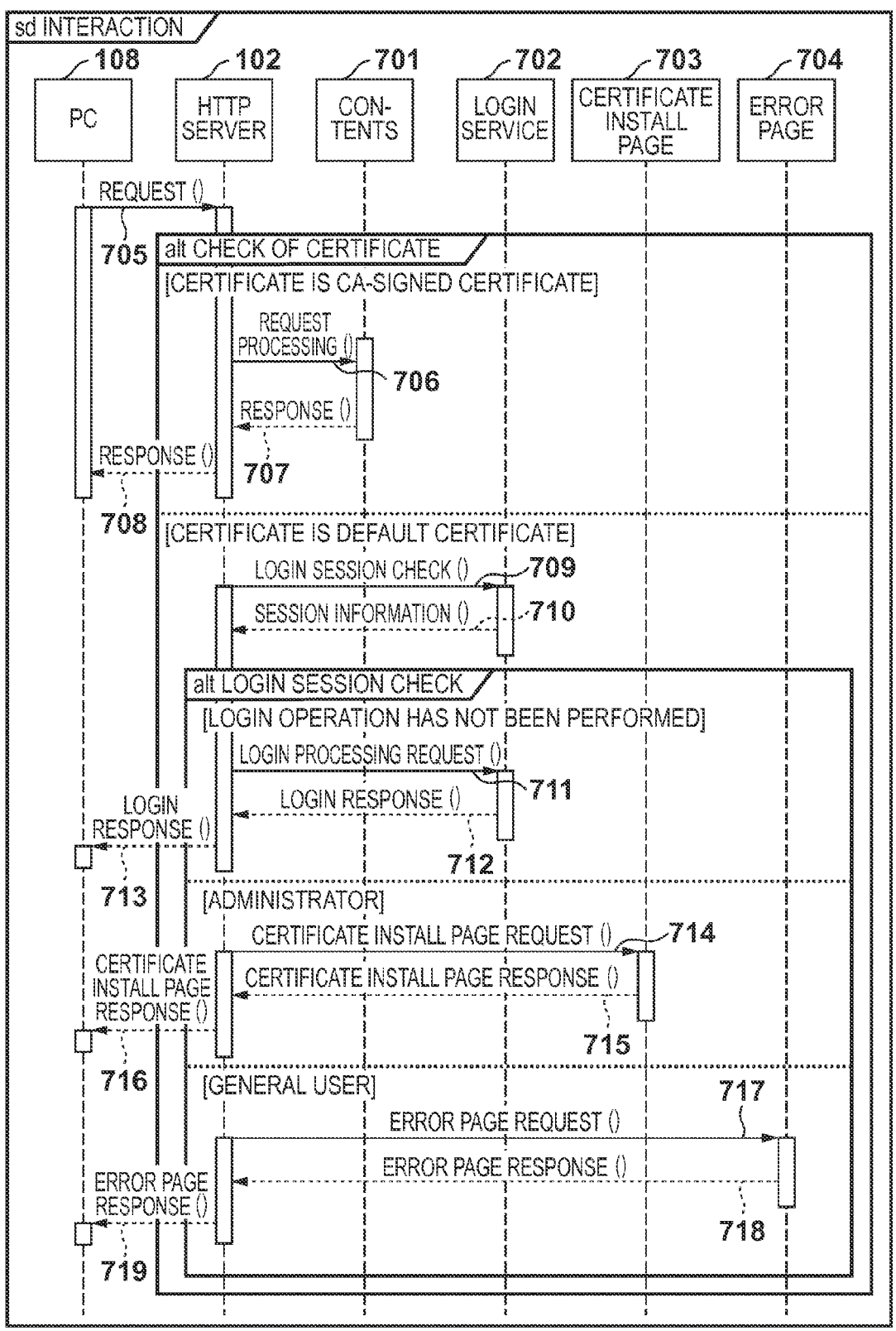
FIG. 7 is a sequence chart for explaining a processing procedure according to the embodiment.

FIG. 7 is a sequence chart for explaining a processing procedure according to the embodiment.

Referring to FIG. 7, the HTTP server 102 includes the objects of Web contents 701, a login service 702, a CA certificate install page 703, and an error page 704. These objects are stored in the HDD 107 (FIG. 2), and are loaded in the memory 106 in execution.

In 705, the PC 108 transmits a request message to the HTTP server 102. An SSL certificate registered in the HTTP server 102 is identified. If the certificate is a CA-signed certificate, the HTTP server 102 transmits a request processing message to the Web contents 701 in 706. The Web contents 701 process contents of the request, and generate response data. In 707, the Web contents 701 return a response message to the HTTP server 102. The HTTP server 102 transmits the received response message as a response message to the PC 108 in 708.

On the other hand, if only a default certificate is registered as an SSL certificate in the HTTP server 102, the HTTP server 102 receives a request message from the PC 108 in 705. In this case, the HTTP server 102 transmits a login session check message to the login service 702 in 709. The login service 702 returns login session information to the HTTP server 102 in 710.

If a login operation has not been performed, the login service 702 returns an invalid login session. Thus, the HTTP server 102 transmits a login processing request message to the login service 702 in 711. Then, the login service 702 returns a login page as a login response in 712, and the HTTP server 102 returns a login page message (corresponding to the login page 803 in FIG. 8) to the PC 108 in 713.

On the other hand, if the user has performed a login operation, the PC 108 transmits a request message to the HTTP server 102 in 705. The HTTP server 102 determines whether the login user is an administrator or a general user. If the login user is an administrator, the HTTP server 102 transmits a certificate install page request to the CA certificate install page 703 in 714. In response to this, the CA certificate install page 703 generates an install page, and returns it to the HTTP server 102 in 715. The HTTP server 102 returns, as a response, the CA certificate install page (corresponding to the page 804 shown in FIG. 8) to the PC 108 in 716.

On the other hand, if the login user is a general user, the HTTP server 102 transmits an error page request to the error page 704 in 717. In response to this, the error page 704 generates an error page, and returns it to the HTTP server 102 in 718. The HTTP server 102 returns, as an error response, the error page response (corresponding to the page 805 shown in FIG. 8) to the PC 108 in 719. Note that an administrator calling page may be returned as the error page response.

When the administrator of the HTTP server 102 installs a CA certificate through the CA-signed certificate install page (the page 804 shown in FIG. 8), he/she restarts the HTTP server 102. This enables the HTTP server 102 to make SSL communication using the CA-signed certificate.

According to the embodiment, as described above, it is possible to explicitly indicate, to the user who has accessed an HTTPS server which has only a selfsigned certificate, that the HTTPS server has a security issue.

Furthermore, according to the embodiment, it is possible to provide a CA-signed certificate install page to only the administrator of a server.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-249070, filed Nov. 14, 2011, which is hereby incorporated by reference herein in its entirety.

What is claimed is:

1. A communication apparatus having an HTTP server function, comprising:
   a processor; and
   a memory,
   wherein the processor executes process steps stored in the memory to perform the steps of:
   storing a certificate;
   determining whether the certificate stored in said certificate storage unit is a CA-signed certificate which is signed by a CA (Certificate Authority);
   determining whether a user who accesses to the communication apparatus from an external apparatus is an administrator; and
   controlling to, in a case where it is determined that the stored certificate is not the CA-signed certificate and it is determined that the user is not the administrator, limit a SSL (Secure Socket Layer) communication between the external apparatus and the communication apparatus.

2. The apparatus according to claim 1, wherein, in a case where it is determined that the certificate stored in said certificate storage unit is not the CA-signed certificate and it is determined that the user is not the administrator, there is control so as to not not transmit to the external apparatus an install page for installing the CA-signed certificate in the communication apparatus.

3. The apparatus according to claim 1, wherein, in a case where it is determined that the certificate stored in said certificate storage unit is not the CA-signed certificate and it is determined that the user is the administrator, there is control to transmit to the external apparatus an install page for installing the CA-signed certificate in the communication apparatus.

4. The apparatus according to claim 1, wherein, in a case where it is determined that the certificate stored in said certificate storage unit is not the CA-signed certificate and it is determined determines that the user is not the administrator, there is control to transmit to the external apparatus an error page indicating that an access by the user to the communication apparatus is limited.

5. The apparatus according to claim 1, wherein, in a case where it is determined that the certificate stored in said certificate storage unit is the CA-signed certificate, there is control to transmit to the external apparatus content required by the user.

6. A control method of controlling a communication apparatus with an HTTP server function, comprising:
    a certificate storage step of storing a certificate in a certificate storage unit;
    a first determination step of determining whether the certificate stored in the certificate storage unit is a CA-signed certificate which is signed by a CA (Certificate Authority);
    a second determination step of determining whether a user who accesses to the communication apparatus from an external apparatus is an administrator; and
    a control step of controlling, in a case where said first determination step determines that the certificate stored in said certificate storage unit is not the CA-signed certificate and said second determination step determines that the user is not the administrator, to limit a SSL (Secure Socket Layer) communication between the external apparatus and the communication apparatus,
    wherein a processor and a memory of the communication apparatus function to execute the certificate storage step, the first determining step, the second determining step, and the controlling step.

7. The method according to claim 6, wherein, in a case where said first determination step determines that the certificate stored in said certificate storage unit is not the CA-signed certificate and said second determination step determines that the user is not the administrator, said control step does not transmit to the external apparatus an install page for installing the CA-signed certificate in the communication apparatus.

8. The method according to claim 6, wherein, in a case where said first determination step determines that the certificate stored in said certificate storage unit is not the CA-signed certificate and said second determination step determines that the user is the administrator, said control step transmits to the external apparatus an install page for installing the CA-signed certificate in the communication apparatus.

9. The method according to claim 6, wherein, in a case where said first determination step determines that the certificate stored in said certificate storage unit is not the CA-signed certificate and said second determination step determines that the user is not the administrator, said control step transmits to the external apparatus an error page indicating that an access by the user to the communication apparatus is limited.

10. The method according to claim 6, wherein, in a case where said first determination step determines that the certificate stored in said certificate storage unit is the CA-signed certificate, said control step transmits to the external apparatus content required by the user.

11. A non-transitory computer-readable storage medium storing a computer program for controlling a communication apparatus having an HTTP server function, the program comprising code to execute:
    a certificate storage step of storing a certificate in a certificate storage unit;
    a first determination step of determining whether the certificate stored in said certificate storage unit is a CA-signed certificate which is signed by a CA (Certificate Authority);
    a second determination step of determining whether a user who accesses to the communication apparatus from an external apparatus is an administrator; and
    a control step of controlling, in a case where said first determination step determines that the certificate stored in said certificate storage unit is not the CA-signed certificate and said second determination step determines that the user is not the administrator, to limit a SSL communication between the external apparatus and the communication apparatus.

12. The non-transitory computer-readable storage medium according to claim 11, wherein, in a case where said first determination step determines that the certificate stored in said certificate storage unit is not the CA-signed certificate and said second determination step determines that the user is not the administrator, said control step does not transmit to the external apparatus an install page for installing the CA-signed certificate in the communication apparatus.

13. The non-transitory computer-readable storage medium according to claim 11, wherein, in a case where said first determination step determines that the certificate stored in said certificate storage unit is not the CA-signed certificate and said second determination step determines that the user is the administrator, said control step transmits to the external apparatus an install page for installing the CA-signed certificate in the communication apparatus.

14. The non-transitory computer-readable storage medium according to claim 11, wherein, in a case where said first determination step determines that the certificate stored in said certificate storage unit is not the CA-signed certificate and said second determination step determines that the user is not the administrator, said control step transmits to the external apparatus an error page indicating that an access by the user to the communication apparatus is limited.

15. The non-transitory computer-readable storage medium according to claim 11, wherein, in a case where said first determination step determines that the certificate stored in said certificate storage unit is the CA-signed certificate, said control step transmits to the external apparatus content required by the user.

* * * * *